(12) United States Patent
Liu

(10) Patent No.: US 12,557,087 B2
(45) Date of Patent: Feb. 17, 2026

(54) RESOURCE INDICATION METHOD AND APPARATUS, AND RESOURCE DETERMINATION METHOD AND APPARATUS

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 503 days.

(21) Appl. No.: 18/002,784

(22) PCT Filed: Jul. 3, 2020

(86) PCT No.: PCT/CN2020/100255
§ 371 (c)(1),
(2) Date: Dec. 21, 2022

(87) PCT Pub. No.: WO2022/000500
PCT Pub. Date: Jan. 6, 2022

(65) Prior Publication Data
US 2023/0247616 A1    Aug. 3, 2023

(51) Int. Cl.
*H04W 72/0457*    (2023.01)
*H04L 5/00*    (2006.01)
(Continued)

(52) U.S. Cl.
CPC ....... *H04W 72/0457* (2023.01); *H04L 5/0005* (2013.01); *H04W 72/23* (2023.01); *H04W 72/51* (2023.01)

(58) Field of Classification Search
None
See application file for complete search history.

(56) References Cited

U.S. PATENT DOCUMENTS

2020/0228966 A1*    7/2020    Xu ...................... H04W 72/23
2022/0167309 A1*    5/2022    Kim .................... H04W 52/242
(Continued)

FOREIGN PATENT DOCUMENTS

CN    110602731 A    12/2019
CN    111937468 A  * 11/2020  ............ H04W 72/23
(Continued)

OTHER PUBLICATIONS

SG 10202003546 (Year: 2021).*
Notice of Reasons for Refusal for Japanese Patent Application No. 2022-581017, issued on Oct. 31, 2023, 8 pages.
(Continued)

*Primary Examiner* — Christopher T Wyllie
(74) *Attorney, Agent, or Firm* — Finnegan, Henderson, Farabow, Garrett & Dunner, L.L.P.

(57) ABSTRACT

A method for indicating a resource is performed by a base station, and includes: configuring a first Control Resource Set Zero (CORESET #0) on a first time-frequency resource, and configuring a second CORESET #0 on a second time-frequency resource, in response to allowing a first terminal supporting a bandwidth greater than or equal to a preset bandwidth to access and allowing a second terminal supporting a bandwidth less than the preset bandwidth to access; and broadcasting a first index, to indicate the first time-frequency resource to the first terminal and to indicate the second time-frequency resource to the second terminal.

19 Claims, 7 Drawing Sheets

(51) Int. Cl.
*H04W 72/23* (2023.01)
*H04W 72/51* (2023.01)

(56) References Cited

U.S. PATENT DOCUMENTS

| | | | | |
|---|---|---|---|---|
| 2023/0046087 A1* | 2/2023 | Ahmad | | H04W 52/0216 |
| 2023/0164714 A1* | 5/2023 | Kim | | H04W 56/0015 |
| 2023/0247616 A1* | 8/2023 | Liu | | H04W 72/51 |
| | | | | 370/329 |

FOREIGN PATENT DOCUMENTS

| | | | | |
|---|---|---|---|---|
| EP | 4346136 A1 | * | 4/2024 | H04L 1/0071 |
| SG | 10202003546X | * | 11/2021 | |
| SG | 10202003546X A | * | 11/2021 | |

OTHER PUBLICATIONS

Lenovo, Motorola Mobility, "On UE complexity reduction features", 3GPP TSG RAN WG1 Meeting #101, R1-2003838, E-meeting, May 25-Jun. 5, 2020, 5 pages.

3GPP TS 38.213 V15.9.0 (Mar. 2020); 3rd Generation Partnership Project; Technical Specification Group Radio Access Network; NR; Physical layer procedures for control (Release 15).

The First Office Action for Chinese Patent Application No. 202080001426,2, dated Nov. 18, 2022, 15 pages.

CMCC, "Discussion on UE complexity reduction", 3GPP TSG RAN WG1 #101, R1-2003966, e-Meeting, May 25-Jun. 5, 2020, 5 pages.

"Performance enhancements for NB-IoT coexistence with NR", Huawei, HiSilicon, 3GPP TSG RAN WG1 Meeting #97, R1-1905974, Reno, USA, May 13-17, 2019, 5 pages.

Office Action issued by the Korean Patent Office on Apr. 4, 2025, in corresponding Application No. KR 10-2023-7003187, 11 pages.

* cited by examiner

| index | SS/PBCH block and CORESET multiplexing pattern | Number of RBs $N_{NB}^{CORESET}$ | Number of Symbols $N_{symb}^{CORESET}$ | Offset(RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Rserved | | | |

FIG. 5A

| index | SS/PBCH block and CORESET multiplexing pattern | Number of RBs $N_{NB}^{CORESET}$ | Number of Symbols $N_{symb}^{CORESET}$ | Offset(RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | | | | |
| 13 | | | | |
| 14 | | | | |
| 15 | | | | |

FIG. 5B

RESOURCE INDICATION METHOD AND APPARATUS, AND RESOURCE DETERMINATION METHOD AND APPARATUS

CROSS-REFERENCE TO RELATED APPLICATION

This application is a national phase of International Application No. PCT/CN2020/100255, filed on Jul. 3, 2020, the content of which is hereby incorporated by reference in its entirety.

TECHNICAL FIELD

The disclosure relates to a field of communication technologies, specifically to a method and an apparatus for indicating a resource, a method and an apparatus for determining a resource, an electronic device and a computer readable storage medium.

BACKGROUND

In 5G New Radio (NR), an initial access bandwidth supported by a user equipment (UE) is generally relatively large, for example, not less than 20 M. Therefore, in 5G, the bandwidth indicated by the base station to the UE may be greater than or equal to 20 M, which can be indicated to the UE through an index carried in a Master Information Block (MIB).

SUMMARY

According to a first aspect of embodiments of the disclosure, a method for indicating a resource is provided. The method is performed by a base station. The method includes:
configuring a first Control Resource Set Zero (CORESET #0) on a first time-frequency resource, and configuring a second CORESET #0 on a second time-frequency resource, in response to allowing a first terminal supporting a bandwidth greater than or equal to a preset bandwidth to access and allowing a second terminal supporting a bandwidth less than the preset bandwidth to access, and
broadcasting a first index, to indicate the first time-frequency resource to the first terminal and to indicate the second time-frequency resource to the second terminal.

According to a second aspect of embodiments of the disclosure, a method for determining a resource is provided. The device is performed by a terminal. The method includes:
receiving a Master Information Block (MIB) broadcasted by a base station, and determining a frequency domain resource index based on the MIB:
determining first frequency domain resource information associated with the frequency domain resource index based on a first correlation relationship and determining a first frequency domain resource of a first Control Resource Set Zero (CORESET #0) based on the first frequency domain resource information, in response to a bandwidth supported by the terminal being less than a preset bandwidth, in which a bandwidth corresponding to the first frequency domain resource information is less than the preset bandwidth; and
determining second frequency domain resource information associated with the frequency domain resource index based on a second correlation relationship and determining a second frequency domain resource of a second CORESET #0 based on the second frequency domain resource information, in response to the bandwidth supported by the terminal being greater than or equal to the preset bandwidth, in which a bandwidth corresponding to the second frequency domain resource information is less than, or equal to, or greater than the preset bandwidth.

According to a third aspect of embodiments of the disclosure, an electronic device is provided. The electronic device includes:
a processor; and
a memory configured to store instructions executable by the processor;
in which, the processor is configured to implement the above method for indicating the resource, and/or the above method for determining the resource.

According to a fourth aspect of embodiments of the disclosure, a non-transitory computer readable storage medium stored with a computer program is provided. When the program is executed by a processor, the processor is caused to perform the above method for indicating the resource and/or the above method for determining the resource.

BRIEF DESCRIPTION OF THE DRAWINGS

In order to explain the technical solutions in embodiments of the disclosure more clearly, the drawings described in the embodiments will be briefly introduced below. Obviously, the diagrams described as below are only some embodiments of the disclosure. Those skilled in the art may obtain other illustrative creative work.

FIG. 5A is a schematic diagram illustrating a second table according to embodiments of the disclosure.

FIG. 5B is a schematic diagram illustrating a first table according to embodiments of the disclosure.

DETAILED DESCRIPTION

The technical scheme in embodiments of the disclosure will be described clearly and completely in combination with the appended drawings in embodiments of the disclosure. It is obvious that the embodiments described are only a part of embodiments in the disclosure, rather than the whole embodiments. On the basis of embodiments of the disclosure, all other embodiments obtained by those skilled in the art without creative work are within the protection scope of the disclosure.

In a communication process, there are some electronic devices serving as UEs, with a relatively low communication speed reference value, such as less than 5 Mbps, and even 2 Mbps. The initial access bandwidth supported by such type of UEs is generally relatively small, for example, less than 20 M. Therefore, when the bandwidth indicated by the base station to this type of UEs is greater than or equal to 20 M, the UEs do not support the bandwidth, such that the UE cannot determine a Control Resource Set Zero (CORESET #0) indicated by the base station, and further cannot access the base station.

Therefore, a method and an apparatus for indicating a resource, a method and an apparatus for determining a resource, an electronic device and a computer readable storage medium are provided in embodiments of the disclosure.

According to embodiments of the disclosure, the base station may configure the first CORESET #0 and the second CORESET #0 in response to allowing the first terminal supporting the bandwidth greater than or equal to the preset bandwidth to access and allowing the second terminal supporting the bandwidth less than the preset bandwidth to access, and indicate the time-frequency resource of the first CORESET #0 to the first terminal and the time-frequency resource of the second CORESET #0 to the second terminal through an index (i.e., the first index). Therefore, both the first terminal and the second terminal may access the base station, and the base station does not need to broadcast two indexes, which is beneficial to avoiding waste of communication resources.

For the terminal supporting the bandwidth less than the preset bandwidth, the bandwidth indicated by the base station through broadcasting is less than the preset bandwidth, and for the terminal supporting the bandwidth greater than or equal to the preset bandwidth, the bandwidth indicated by the base station through broadcasting may be less than, or greater than or equal to the preset bandwidth, which is not limited here.

Figure 1:
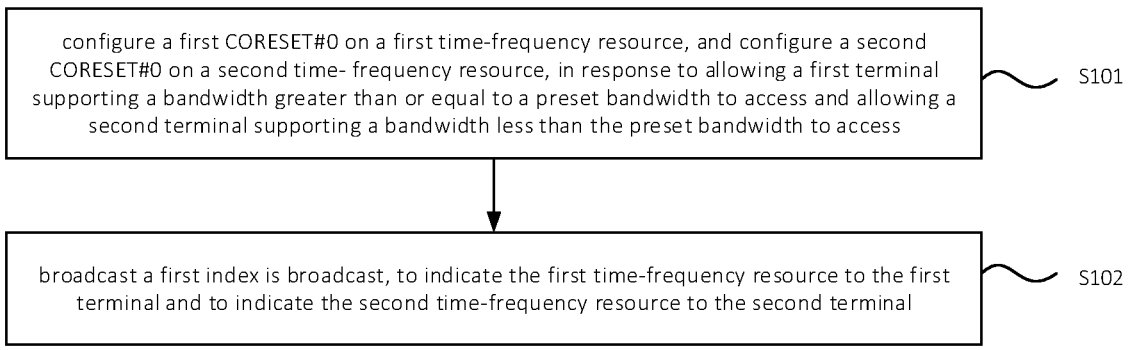
FIG. 1 is a schematic flowchart illustrating a method for indicating a resource according to embodiments of the disclosure.

FIG. 1 is a schematic flowchart illustrating a method for indicating a resource according to embodiments of the disclosure. The method according to embodiments of the disclosure may be performed by a base station. The base station may be a 5G base station, and the base station may communicate with a user equipment (UE). The UE may be a mobile phone, a tablet computer, a wearable device, a sensor, an Internet of things device and other electronic devices.

In an embodiment, the "terminal" as described in the below embodiments refers to a Reduced Capability NR Devices (REDCAP). For this type of UEs, initial access bandwidths supported by different UEs may be different. For example, the initial access bandwidths supported by some UEs are greater than or equal to a preset bandwidth and the initial access bandwidths supported by some UEs are less than the preset bandwidth. The preset bandwidth may be 20 M.

As illustrated in FIG. 1, the method for indicating the resource may include the following.

In step S101, a first Control Resource Set Zero (CORESET #0) is configured on a first time-frequency resource, and a second CORESET #0 is configured on a second time-frequency resource, in response to allowing a first terminal supporting a bandwidth greater than or equal to a preset bandwidth to access and allowing a second terminal supporting a bandwidth less than the preset bandwidth to access.

In step S102, a first index is broadcast, to indicate the first time-frequency resource to the first terminal and to indicate the second time-frequency resource to the second terminal.

In an embodiment, the Control Resource Set Zero (CORESET #0), also called as Control-resource set 0, is in the Synchronization Signal and PBCH block. The time-frequency resource of the CORESET #0 may be a time-frequency resource of the CORESET #0 in the Synchronization Signal and PBCH block. The terminal may find the CORESET #0 from the Synchronization Signal and PBCH block based on the time-frequency resource of the CORESET #0 after determining the time-frequency resource of the CORESET #0.

In an embodiment, the base station may allow the access of the first terminal supporting a bandwidth greater than or equal to the preset bandwidth. In addition, the base station may allow or may not allow the access of the second terminal supporting a bandwidth less than the preset bandwidth, which is configured based on requirements.

In an embodiment, the base station may configure the first CORESET #0 on the first time-frequency resource and configure the second CORESET #0 on the second time-frequency resource, in response to allowing the first terminal supporting the bandwidth greater than or equal to the preset bandwidth to access and allowing the second terminal supporting the bandwidth less than the preset bandwidth to access.

Further, the first index may be broadcasted, to indicate the first time domain resource to the first terminal and to indicate the second time-frequency resource to the second terminal through the first index.

The first index may be included in a Master Information Block (MIB). For example, the first index is eight bits of specific bits in the MIB, in which four bits correspond to a frequency domain resource index and the other four bits correspond to a time domain resource index. The first index may include the frequency domain resource index and the time domain resource index.

Each of the first terminal and the second terminal may store a table between the frequency domain resource indexes and the frequency domain resources and a table between the time domain resource indexes and the time domain resources, and the bandwidths supported by the first terminal are different from the bandwidths supported by the second terminal. For example, based on the different initial access bandwidths supported by the first terminal and the second terminal respectively, the pre-stored tables may be different. Since the tables are different, the frequency domain resources searched for based on the same index may be different, and the time domain resources searched for based on the same index may be different. Therefore, the first terminal may determine the first time domain resource based on the first index, and the second terminal may determine the second time-frequency resource based on the first index.

To ensure both the UE supporting an initial access bandwidth greater than or equal to 20 M and the UE supporting an initial access bandwidth to determine respective resources for the CORESET #0 indicated by the base station to access the base station, the following manner is proposed in the related art.

The base station broadcasts two indexes, in which one index indicates a bandwidth less than 20 M and thus is broadcasted to the UEs supporting the initial access bandwidth less than 20 M, and the other index indicates a bandwidth greater than or equal to 20 M and thus is broadcasted to the UEs supporting the initial access bandwidth greater than or equal to 20 M. Therefore, the base station needs to repeatedly broadcast the indexes, which leads to waste of communication resources.

According to embodiments of the disclosure, the base station may configure the first CORESET #0 and the second CORESET #0 in response to allowing both the first terminal supporting the bandwidth greater than or equal to the preset bandwidth and the second terminal supporting the bandwidth less than the preset bandwidth to access, and indicate the time-frequency resource of the first CORESET #0 to the first terminal and indicate the time-frequency resource of the second CORESET #0 to the second terminal via one index (i.e., the first index), so that both the first terminal and the second terminal may access the base station. In addition, the base station does not need to broadcast the two indexes, which is beneficial to avoiding waste of communication resources.

Figure 2:
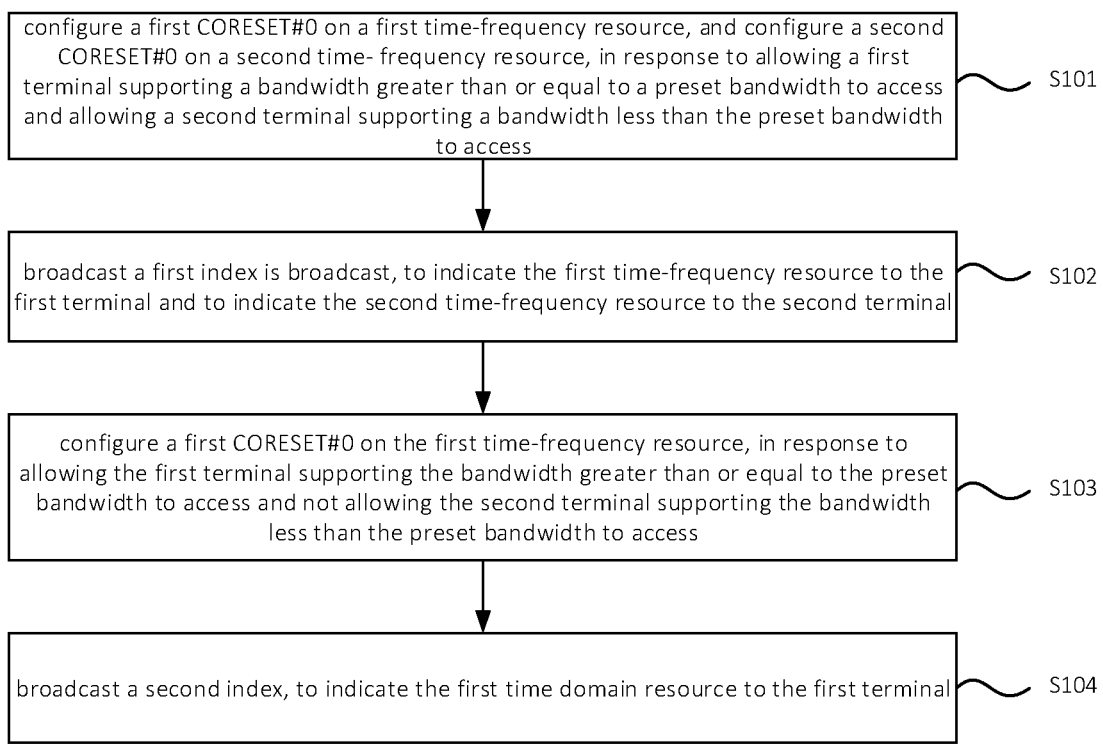
FIG. 2 is a schematic flowchart illustrating another method for indicating a resource according to embodiments of the disclosure.

FIG. 2 is a schematic flowchart illustrating another method for indicating a resource according to embodiments of the disclosure. As illustrated in FIG. 2, the method further includes the following.

In step S103, the first CORESET #0 is configured on the first time-frequency resource, in response to allowing the first terminal supporting the bandwidth greater than or equal to a preset bandwidth to access and not allowing the second terminal supporting the bandwidth less than the preset bandwidth to access.

In step S104, a second index is broadcasted, to indicate the first time domain resource to the first terminal.

It is noteworthy that, the execution sequences between the steps S103 and 104 and the steps S101 and S102 are not limited in the embodiments. For example, the steps S103 and S104 may be executed after the step S102, as illustrated in FIG. 2. Alternatively, the steps S103 and S104 can be executed before the step S101.

In an embodiment, the first terminal can access the base station and the second device cannot access the base station, in response to allowing the first terminal supporting the bandwidth greater than or equal to the preset bandwidth to access and not allowing the second terminal supporting the bandwidth less than the preset bandwidth to access.

Then, the base station may configure the first CORESET #0 on the first time-frequency resource, and not configure the second CORESET #0 on the second time-frequency resource. Since the second CORESET #0 is not configured on the second time-frequency resource, the second index can be broadcasted to only indicate the first time domain resource to the first terminal.

It is noteworthy, candidate value ranges of the first index and the second index may be completely the same, or may be partially the same and partially different. For example, the candidate value range of the first index and the candidate value range of the second index are both from 0 to 15. In other words, each candidate value range includes 16 indexes in total.

Figure 3:
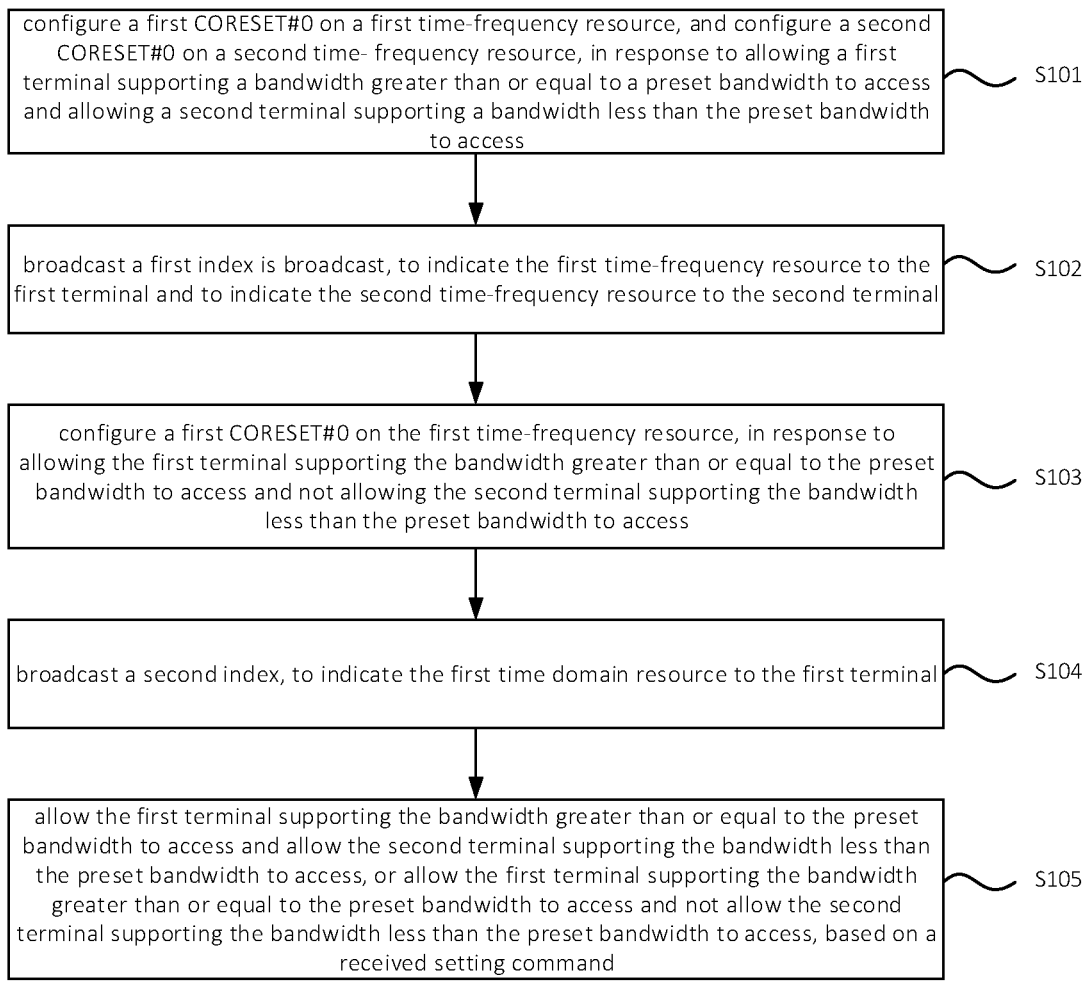
FIG. 3 is a schematic flowchart illustrating still another method for indicating a resource according to embodiments of the disclosure.

FIG. 3 is a schematic flowchart illustrating another method for indicating a resource according to embodiments of the disclosure. As illustrated in FIG. 3, the method further includes the following.

In step S105, based on a received setting command, the first terminal supporting the bandwidth greater than or equal to a preset bandwidth is allowed to access and the second terminal supporting the bandwidth less than the preset bandwidth is allowed to access, or the first terminal supporting the bandwidth greater than or equal to the preset bandwidth is allowed to access and the second terminal supporting the bandwidth less than the preset bandwidth is not allowed to access.

It is noteworthy that, the execution sequences of the step S105 and the steps S101 and block S103 are not limited in the above embodiments. For example, the step S105 may be executed after the step S103, or the step S105 may be executed before the step S103 and even before the step S101.

However, in an example, if the step S105 is executed before the step S101, the case that the base station allows the first terminal supporting the bandwidth greater than or equal to the preset bandwidth to access and does not allow the second terminal supporting the bandwidth less than the preset bandwidth to access is applicable thereto, while the case that the base station does not allow the first terminal supporting the bandwidth greater than or equal to the preset bandwidth to access and allows the second terminal supporting the bandwidth less than the preset bandwidth to access is not applicable thereto, and thus the steps S103 and S104 may not be executed in this example.

Correspondingly, in an example, when the step S105 is executed before the step S101, the case that the base station allows the first terminal supporting the bandwidth greater than or equal to the preset bandwidth to access and allows the second terminal supporting the bandwidth less than the preset bandwidth to access is applicable thereto and the case that the base station does not allow the first terminal supporting the bandwidth greater than or equal to the preset bandwidth to access and does not allow the second terminal supporting the bandwidth less than the preset bandwidth to access is not applicable thereto, and thus the steps S101 and S102 may not be executed in this example.

In an embodiment, for the case that the base station allows the first terminal supporting the bandwidth greater than or equal to the preset bandwidth to access and allows the second terminal supporting the bandwidth less than the preset bandwidth to access and the case that the base station allows the first terminal supporting the bandwidth greater than or equal to the preset bandwidth to access and does not allow the second terminal supporting the bandwidth less than the preset bandwidth to access, which case is applicable may be adjusted according to requirements. For example, this can be adjusted by sending a setting command to the base station.

Figure 4:
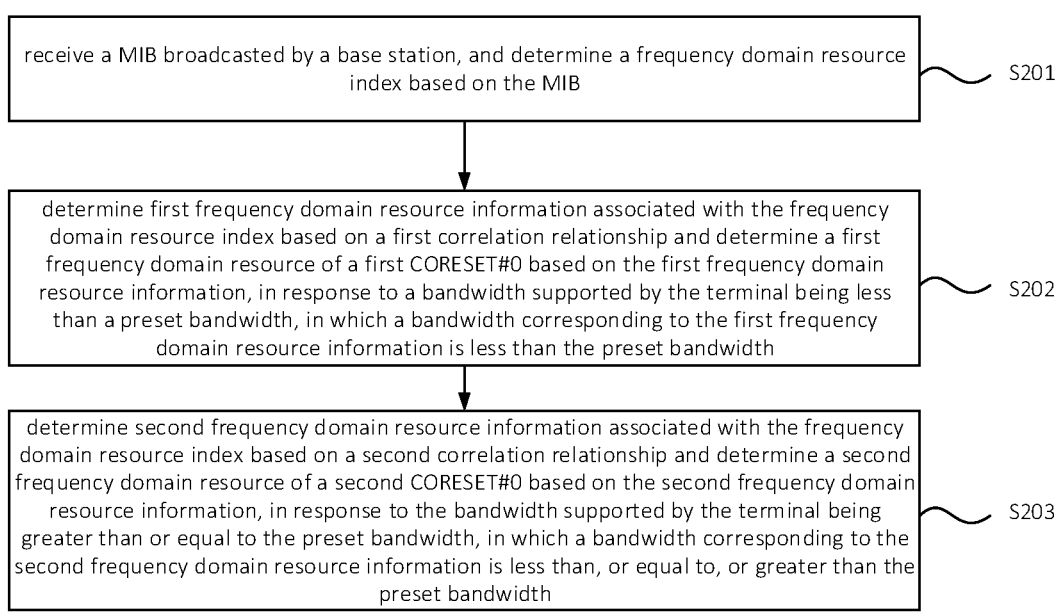
FIG. 4 is a schematic flowchart illustrating a method for determining a resource according to embodiments of the disclosure.

FIG. 4 is a schematic flowchart illustrating a method for determining a resource according to embodiments of the disclosure. The method according to the embodiments may be performed by a terminal. The terminal can be a user equipment (UE) to communicate with a base station. The base station may be a 5G base station, and the terminal may be a mobile phone, a tablet computer, a wearable device, a sensor, an Internet of things device and other electronic devices.

In an embodiment, the "terminal" as described in the below embodiments refer to a Reduced Capability NR Device (REDCAP). For this type of UEs, initial access bandwidths supported by different UEs may be different. For example, the initial access bandwidths supported by some UEs are greater than or equal to a preset bandwidth and the initial access bandwidths supported by some UEs are less than the preset bandwidth. The preset bandwidth may be 20 M.

As illustrated in FIG. 4, the method for determining the resource may include the following.

In step S201, a Master Information Block (MIB) broadcasted by a base station is received, and a frequency domain resource index is determined based on the MIB.

In step S202, first frequency domain resource information associated with the frequency domain resource index is determined based on a first correlation relationship, and a first frequency domain resource of a first CORESET #0 is determined based on the first frequency domain resource information, in response to a bandwidth supported by the terminal being less than a preset bandwidth. The bandwidth corresponding to the first frequency domain resource information is less than the preset bandwidth.

In step S203, second frequency domain resource information associated with the frequency domain resource index is determined based on a second correlation relationship, and a second frequency domain resource of a second CORESET #0 is determined based on the second frequency domain resource information, in response to the bandwidth supported by the terminal being greater than or equal to the preset bandwidth. The bandwidth corresponding to the second frequency domain resource information is less than, or equal to, or greater than the preset bandwidth.

It is noteworthy that, the bandwidth supported by the terminal may refer to the initial access bandwidth.

In an embodiment, the base station may broadcast the MIB. The MIB may include the frequency domain resource index. For example, eight bits of specific bits in the MIB can be used, in which four bits correspond to the frequency domain resource index, and the other four bits correspond to the time domain resource index.

In an embodiment, the first correlation relationship may be stored in advance in the first terminal, and the second correlation relationship may be stored in advance in the second terminal, and the first correlation relationship may be different from the second correlation relationship. The first correlation relationship and the second correlation relationship may be tables, and the table records the correlation relationship between the frequency domain resource indexes and the frequency domain resource information. The first table and the second table may be completely different or may be partially different and partially the same.

Certainly, the first correlation relationship and the second correlation relationship may also be in other forms in addition to table. Below, embodiments of the disclosure are illustrated by taking that the first correlation relationship is the first table and the second correlation relationship is the second table as an example.

According to embodiments of the disclosure, before broadcasting the MIB, the base station has configured the first CORESET #0 on the first frequency domain resource and has configured the second CORESET #0 on the second frequency domain resource. Before the terminal receives the MIB broadcasted by the base station, the first table and the second table have been pre-stored, and the first table and the second table each record a correspondence relationship between indexes and the frequency domain resource information. The frequency domain resource information includes, but is not limited to, number of resource blocks (RBs), number of symbols and offset.

Based on the frequency domain resource information, on one hand, the terminal may determine the bandwidth indicated by the base station based on for example the number of RBs and other parameters, and on the other hand, the terminal may determine the frequency domain resource of the CORESET #0 indicated by the base station based on for example the number of RBs, the number of symbols and the offset.

The first table may be different from the second table. The terminal supporting the bandwidth less than the preset bandwidth may have the first table stored therein, and thus the first frequency domain resource information may be determined from the first table based on the frequency domain resource index and a frequency domain resource location of the first CORESET #0 may be determined based on the first frequency domain resource information. The terminal supporting the bandwidth greater than or equal to the preset bandwidth may have the second table stored therein, and thus the second frequency domain resource information may be determined from the second table based on the frequency domain resource index, and a frequency domain resource location of the second CORESET #0 may be determined based on the second frequency domain resource information.

Accordingly, both the terminal supporting the bandwidth less than the preset bandwidth and the terminal supporting the bandwidth greater than or equal to the preset bandwidth may determine respective frequency domain resource locations of the CORESET #0, and further both terminals can access the base station. In addition, the base station may indicate the different frequency domain resource locations of the CORESET #0 respectively to these two types of terminals through one frequency domain resource index without the need of broadcasting two indexes, which is beneficial to avoiding waste of communication resources.

In addition, to ensure both the UE supporting the initial access bandwidth greater than or equal to 20 M and the UE supporting the initial access bandwidth less than 20 M to determine respective CORESET #0 indicated by the base station and further to access the base station, the following manner is proposed in the related art.

The initial access bandwidths indicated by the base station through broadcasting are all less than 20 M, which brings restrictions on the UE supporting the initial access bandwidth greater than or equal to 20 M, and thus the flexibility is low.

According to embodiments, for the terminal supporting the bandwidth less than the preset bandwidth, the bandwidth indicated by the base station through broadcasting is less than the preset bandwidth. For the terminal supporting the bandwidth greater than or equal to the preset bandwidth, the bandwidth indicated by the base station through broadcasting may be less than, or greater than or equal to the preset bandwidth, which will not bring restrictions on the terminal.

In some examples, target frequency domain information whose bandwidth is less than the preset bandwidth in the second frequency domain resource information is the same as first target information associated with a target index corresponding to the target frequency domain information in the first frequency domain resource information.

In an embodiment, the first correlation relationship and the second correlation relationship may be partially the same. For example, if the first correlation relationship is the first table and the second correlation relationship is the second table, the first table and the second table may be partially the same.

As described in the above embodiments, based on the frequency domain resource information, on one hand, the terminals may determine the bandwidth indicated by the base station; and on the other hand, the terminals may determine respective frequency domain resources of the CORESET #0 indicated by the base station. The bandwidth indicated by the base station to each terminal through the frequency domain resource index may be not a single bandwidth but a plurality of bandwidths.

FIG. 5A is a schematic diagram illustrating a second table according to embodiments of the disclosure. FIG. 5B is a schematic diagram illustrating a first table according to embodiments of the disclosure.

In an embodiment, the second correlation relationship pre-stored in a terminal supporting the bandwidth greater than or equal to the preset bandwidth is the second table, and the second table may be as illustrated in FIG. 5A. The second table include 16 indexes, i.e., 0 to 15. The bandwidths indicated by the base station that are determined by the terminal according to the frequency domain resource information corresponding to the indexes 0 to 11 are all less than the preset bandwidth. For example, the bandwidths are all less than 20 M. The bandwidths indicated by the base station that are determined by the terminal according to the frequency domain resource information corresponding to the indexes from 12 to 15 are all greater than or equal to the preset bandwidth. For example, the bandwidths are all greater than or equal to 20 M.

In the second table illustrated as FIG. 5A, the bandwidths indicated by the base station that are determined based on the frequency domain resource information corresponding to the indexes from 0 to 11 are all less than the preset bandwidth, which means that the bandwidths corresponding to these second frequency domain resource information in the second table are all less than the preset bandwidth, so that these second frequency domain resource information are used as the target frequency domain information, and target indexes corresponding to the target frequency domain information are 0 to 11.

Since the bandwidths indicated by the base station that are determined according to the frequency domain resource information corresponding to the indexes 0 to 11 in the second table are all less than the preset bandwidth, these second frequency domain resource information corresponding to indexes 1 to 11 in the second table are used as the target frequency domain information and the target frequency domain information also may be applicable to the terminal supporting the bandwidth less than the preset bandwidth. Therefore, in the first table that is pre-stored in the terminal supporting the bandwidth less than the preset bandwidth, the first frequency domain resource information corresponding to the target indexes may be the same as the target frequency domain information.

For example, the first table is illustrated as FIG. 5B, which includes 16 indexes, 0 to 15. The frequency domain resource information corresponding to the indexes 0 to 11 in the first table is the same as the frequency domain resource information (i.e., the target frequency domain information) corresponding to the indexes 0 to 11 in the second table, and the frequency domain resource information corresponding to the indexes 12 to 15 in the first table is different from the frequency domain resource information corresponding to the indexes 12 to 15 in the second table.

Accordingly, in the first correlation relationship and the second correlation relationship, the contents applicable to the terminal supporting the bandwidth greater than or equal to the preset bandwidth are the same, and the contents applicable to the terminal supporting the bandwidth less than the preset bandwidth are the same, which may reduce complexity when configuring the first correlation relationship and the second correlation relationship.

It is noteworthy that, in FIG. 5B, the frequency domain resource information corresponding to the indexes 12 to 15 is not blank, and the blanks in FIG. 5B represent that these frequency domain resource information may be set based on specific situations.

In some embodiments, the first correlation relationship and/or the second correlation relationship is a table.

In some embodiments, the terminal stores the first correlation relationship in advance in response to the bandwidth supported by the terminal being less than the preset bandwidth, and/or the terminal stores the second correlation relationship in advance in response to the bandwidth supported by the terminal being greater than or equal to the preset bandwidth.

Figure 6:
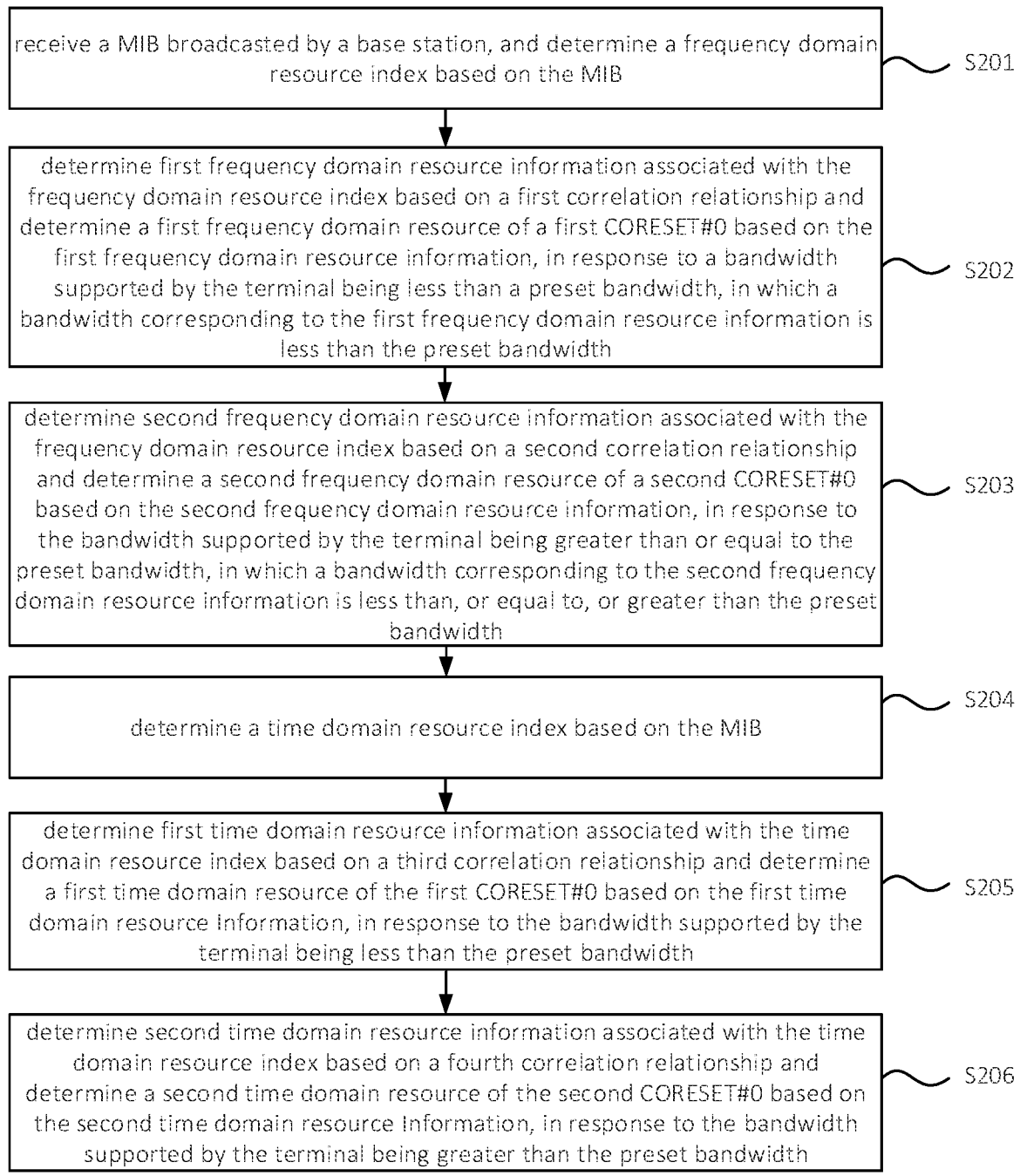
FIG. 6 is a schematic flowchart illustrating another method for determining a resource according to embodiments of the disclosure.

FIG. 6 is a schematic flowchart illustrating another method for determining a resource according to embodiments of the disclosure. As illustrated in FIG. 6, the method further includes the following.

In step S204, a time domain resource index is determined based on an MIB.

In step S205, first time domain resource information associated with the time domain resource index is determined based on a third correlation relationship, and a first time domain resource of a first CORESET #0 is determined based on the first time domain resource information, in response to the bandwidth supported by the terminal being less than the preset bandwidth.

In step S206, second time domain resource information associated with the time domain resource index is determined based on a fourth correlation relationship, and a second time domain resource of a second CORESET #0 is determined based on the second time domain resource information, in response to the bandwidth supported by the terminal being greater than the preset bandwidth.

In an embodiment, the MIB broadcasted by the base station further includes a time domain resource index. For example, eight bits of specific bits in the MIB are used, in which four bits correspond to a frequency domain resource index, and the other four bits correspond to the time domain resource index.

In an embodiment, the third correlation relationship may be stored in the first terminal in advance, the fourth correlation relationship may be stored in the second terminal in advance, and the third correlation relationship may be different from the fourth correlation relationship. The third correlation relationship and the fourth correlation relationship may each be a table, and the table records the correlation relationship between the time domain resource indexes and the time domain resource information. The third table and the fourth table may be completely different or may be partially different and partially the same.

Certainly, the third correlation relationship and the fourth correlation relationship may be may be in other forms in addition to a table. Below, embodiments of the disclosure are illustrated by taking that the third correlation relationship is the third table and the fourth correlation relationship is the fourth table as an example According to embodiments of the disclosure, the base station has configured the first CORESET #0 on a first time-frequency resource and configured the second CORESET #0 on a second time-frequency resource before broadcasting the MIB. However, in the above embodiments, the first terminal only determines the first frequency domain resource in the first time-frequency resource based on the first frequency resource information, but the first time-frequency resource further corresponds to the time domain resource.

Therefore, in order to exactly determine the first time-frequency resource of the first CORESET #0, the first time domain resource of the first CORESET #0 may be determined based on the first time domain resource information, and the first time-frequency resource of the first CORESET #0 may be exactly determined based on both the first frequency domain resource and the first time domain resource.

Correspondingly, the second time domain resource of the second CORESET #0 is determined based on the second time domain resource information, and the second time-frequency resource of the second CORESET #0 may be exactly determined based on both the second frequency domain resource and the second time domain resource.

In some embodiments, the third correlation relationship and/or the fourth correlation relationship is a table.

In some embodiments, the terminal stores the third correlation relationship in advance, and/or the terminal stores the fourth correlation relationship in advance.

Corresponding to the above embodiments of the method for indicating the resource and the method for determining the resource, an apparatus for indicating a resource and an apparatus for determining a resource are further provided in the disclosure.

Figure 7:
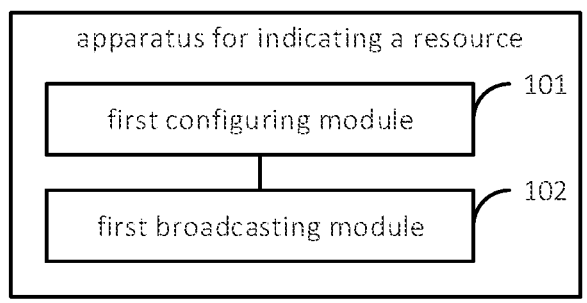
FIG. 7 is a schematic block diagram illustrating an apparatus for indicating a resource according to embodiments of the disclosure.

FIG. 7 is a schematic block diagram illustrating an apparatus for indicating a resource according to embodiments of the disclosure. The apparatus according to the embodiments may be applicable to a base station. The base station may be a 5G base station, and the base station may communicate with a user equipment (UE). The UE may be a mobile phone, a tablet computer, a wearable device, a sensor, an Internet of things device and other electronic devices.

In an embodiment, the "terminal" as described in the below embodiments refer to a Reduced Capability NR Devices (REDCAP). For this type of UEs, initial access bandwidths supported by different UEs may be different. For example, the initial access bandwidths supported by some UEs are greater than or equal to a preset bandwidth and the initial access bandwidths supported by some UEs are less than the preset bandwidth. The preset bandwidth may be 20 M.

As illustrated FIG. 7, the apparatus for indicating the resource may include a first configuring module 101 and a first broadcasting module 102.

The first configuring module 101 is configured to configure a first Control Resource Set Zero (CORESET #0) on a first time-frequency resource and configure a second CORESET #0 on a second time-frequency resource, in response to allowing a first terminal supporting a bandwidth greater than or equal to a preset bandwidth to access and allowing a second terminal supporting a bandwidth less than the preset bandwidth to access.

The first broadcasting module 102 is configured to broadcast a first index, to indicate the first time-frequency resource to the first terminal and to indicate the second time-frequency resource to the second terminal.

Figure 8:
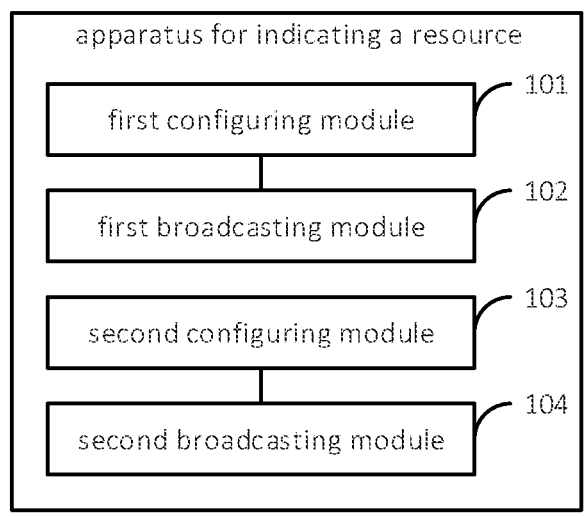
FIG. 8 is a schematic block diagram illustrating another apparatus for indicating a resource according to embodiments of the disclosure.

FIG. 8 is a schematic block diagram illustrating another apparatus for indicating a resource according to embodiments of the disclosure. As illustrated in FIG. 8, the apparatus further includes a second configuring module 103 and a second broadcasting module 104.

The second configuring module 103 is configured to configure the first CORESET #0 on the first time-frequency resource, in response to allowing the first terminal supporting the bandwidth greater than or equal to a preset bandwidth to access and not allowing the second terminal supporting the bandwidth less than the preset bandwidth to access.

The second broadcasting module 104 is configured to broadcast a second index, to indicate the first time domain resource to the first terminal.

Figure 9:
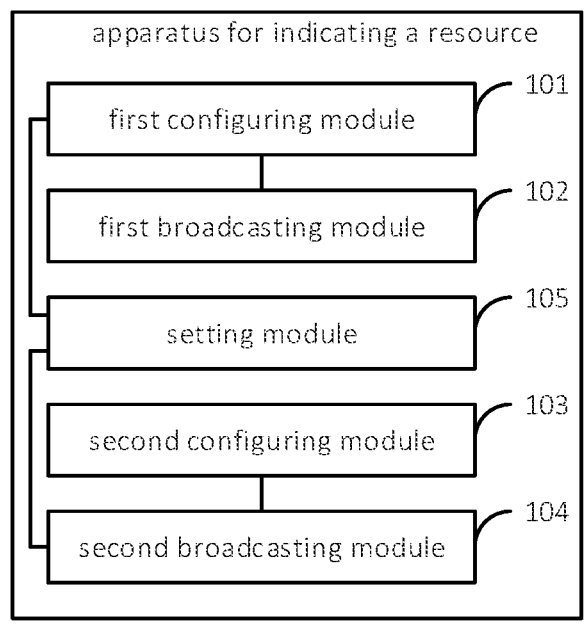
FIG. 9 is a schematic block diagram illustrating still another apparatus for indicating a resource according to embodiments of the disclosure.

FIG. 9 is a schematic block diagram illustrating another apparatus for indicating a resource according to embodiments of the disclosure. As illustrated in FIG. 9, the apparatus further includes a setting module 105.

The setting module 105 is configured to, based on a received setting command, allow the first terminal supporting the bandwidth greater than or equal to a preset bandwidth to access and allow the second terminal supporting the bandwidth less than the preset bandwidth to access, or allow the first terminal supporting the bandwidth greater than or equal to the preset bandwidth to access and not allow the second terminal supporting the bandwidth less than the preset bandwidth to access.

Figure 10:
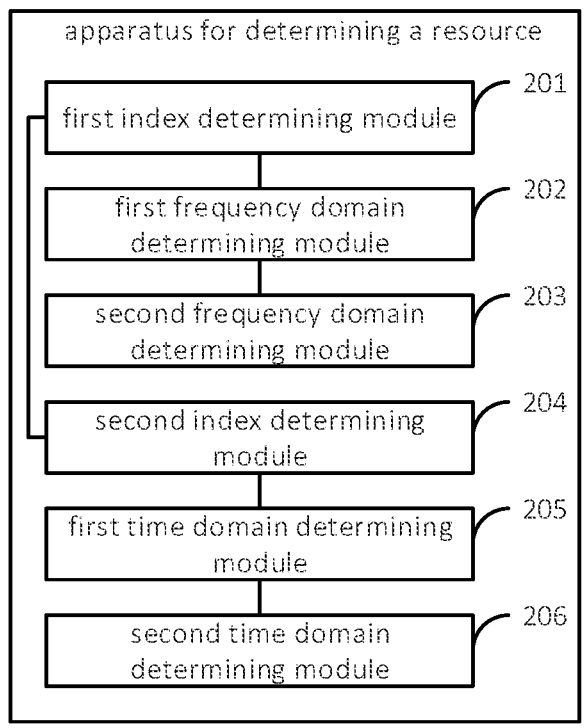
FIG. 10 is a schematic block diagram illustrating an apparatus for determining a resource according to embodiments of the disclosure.

FIG. 10 is a schematic block diagram illustrating an apparatus for determining a resource according to embodiments of the disclosure. The apparatus according to embodiments may be applicable to a terminal. The terminal can be a user equipment (UE) to communicate with a base station. The base station may be a 5G base station, and the terminal may be a mobile phone, a tablet computer, a wearable device, a sensor, an Internet of things device and other electronic devices.

As illustrated in FIG. 10, the apparatus for determining the resource may include a first index determining module 201, a first frequency domain determining module 202 and a second frequency domain determining module 203.

The first index determining module 201 is configured to receive a Master Information Block (MIB) broadcasted by a base station, and determine a frequency domain resource index based on the MIB.

The first frequency domain determining module 202 is configured to determine first frequency domain resource information associated with the frequency domain resource index based on a first correlation relationship, and determine a first frequency domain resource of a first CORESET #0 based on the first frequency domain resource information, in response to a bandwidth supported by the terminal being less than a preset bandwidth. The bandwidth corresponding to the first frequency domain resource information is less than the preset bandwidth.

The second frequency domain determining module 203 is configured to determine second frequency domain resource information associated with the frequency domain resource index based on a second correlation relationship, and determine a second frequency domain resource of a second CORESET #0 based on the second frequency domain resource information, in response to the bandwidth supported by the terminal being greater than or equal to the preset bandwidth. The bandwidth corresponding to the second frequency domain resource information is less than, or equal to, or greater than the preset bandwidth.

In some embodiments, target frequency domain information whose bandwidth is less than the preset bandwidth in the second frequency domain resource information is the same as first target information associated with a target index corresponding to the target frequency domain information in the first frequency domain resource information.

In some embodiments, the first correlation relationship and/or the second correlation relationship is a table.

In some embodiments, the terminal stores the first correlation relationship in advance in response to the bandwidth supported by the terminal being less than the preset bandwidth, and/or the terminal stores the second correlation relationship in advance in response to the bandwidth supported by the terminal being greater than or equal to the preset bandwidth.

In some embodiments, the apparatus further includes a second index determining module 204, a first time domain determining module 205 and a second time domain determining module 206.

The second index determining module 204 is configured to determine a time domain resource index based on the MIB.

The first time domain determining module 205 is configured to determine first time domain resource information associated with the time domain resource index based on a third correlation relationship, and determine a first time domain resource of a first CORESET #0 based on the first time domain source information, in response to the bandwidth supported by the terminal being less than the preset bandwidth.

The second time domain determining module 206 is configured to determine second time domain resource information associated with the time domain resource index based on a fourth correlation relationship, and determine a second time domain resource of a second CORESET #0 based on the second time domain resource information, in response to the bandwidth supported by the terminal being greater than the preset bandwidth.

In some embodiments, the third correlation relationship and/or the fourth correlation relationship is a table.

In some embodiments, the terminal stores the third correlation relationship in advance, and/or the terminal stores the fourth correlation relationship in advance.

With regard to the apparatus in the above embodiments, the specific way each module performs the operation has been described in detail in the embodiments of the method and will not be elaborated here.

The embodiments of the apparatus refers to part descriptions of embodiments of the method since they corresponds to the embodiments of the method. The embodiments of the apparatus described above are only schematic, in which the above modules described as separate parts may or may not be physically separated, the parts shown as modules may or may not be physical modules, that is, may be located in one place, or may be distributed on a plurality of network modules. Some or all modules may be selected according to the actual requirements to achieve the purpose of the present disclosure. Those skilled in the art may understand and implement it without any creative effort.

According to embodiments of the present disclosure, an electronic device is further provided. The electronic device includes: a processor; and a memory configured to store instructions executable by the processor.

The processor is configured to implement the method for indicating the resource as described in the above any embodiment, and/or the method for determining the resource as described in the above any embodiment.

According to embodiments of the present disclosure, a computer readable storage medium stored with a computer program is provided. The program implements the method for indicating the resource as described in the above any embodiment, and/or blocks of the method for determining the resource as described in the above any embodiment when executed by a processor.

Figure 11:
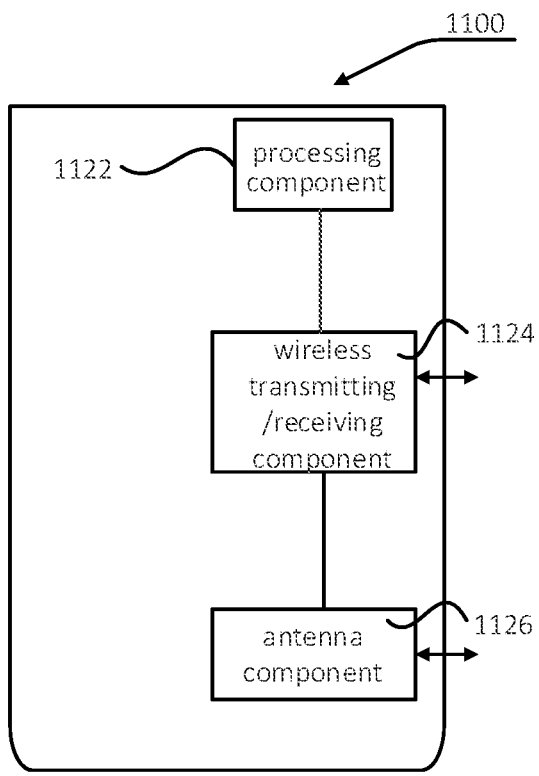
FIG. 11 is a schematic block diagram illustrating a device for indicating a resource according to embodiments of the disclosure.

FIG. 11 is a schematic block diagram illustrating a device 1100 for indicating a resource according to embodiments of the disclosure. The device 1100 may be provided as a base station. As illustrated in FIG. 11, the device 1100 includes a processing component 1122, a wireless transmitting/receiving component 1124, an antenna component 1126, and a signal processing unit peculiar to a wireless interface, and the processing component 1122 may further include one or more processors. One processor of the processing component 1122 may be configured to implement the method for indicating the resource in the above any embodiment.

Figure 12:
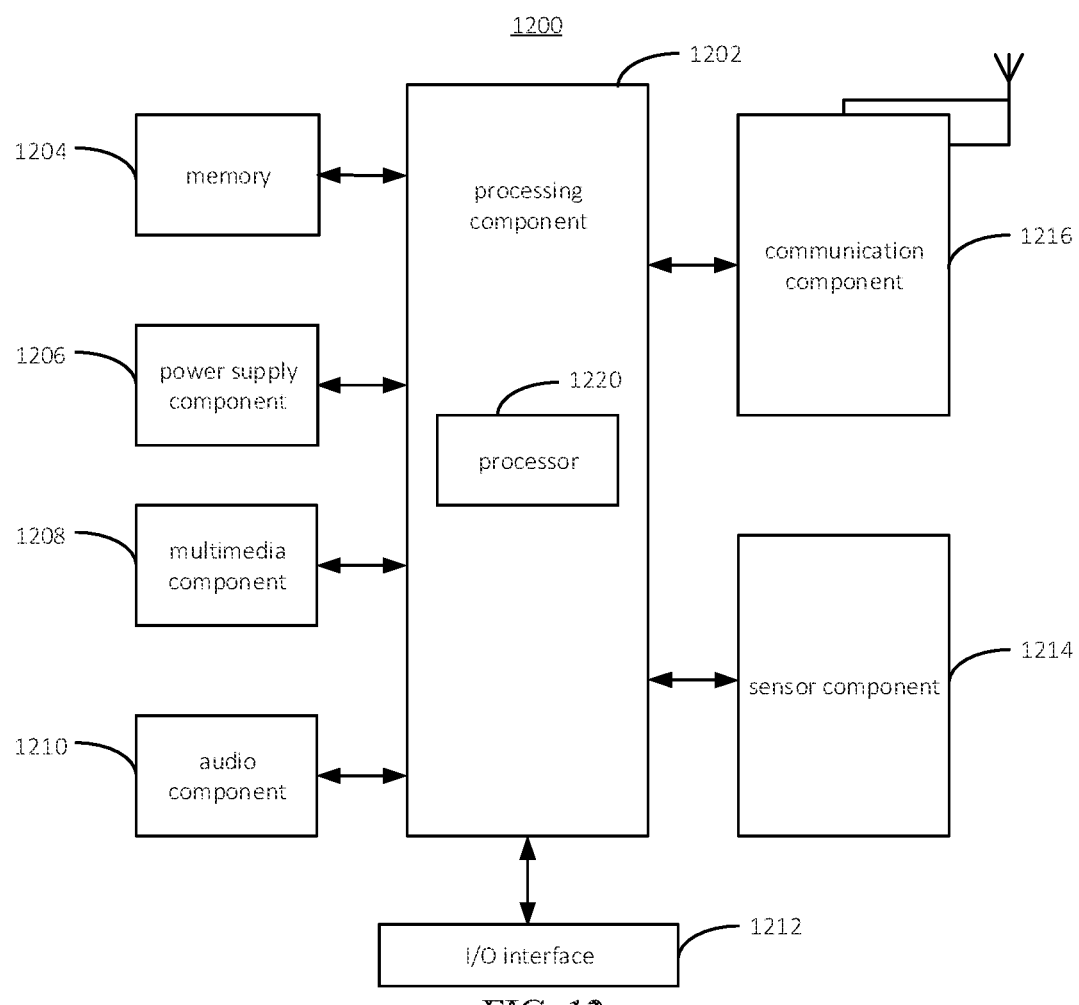
FIG. 12 is a schematic block diagram illustrating a device for determining a resource according to embodiments of the disclosure.

FIG. 12 is a schematic block diagram illustrating a device 1200 for determining a resource according to embodiments of the disclosure. For example, the device 1200 may be a mobile phone, a computer, a digital broadcasting terminal, a messaging device, a game console, a tablet device, a medical equipment, a fitness equipment, a personal digital assistant, etc.

As illustrated FIG. 12, the device 1200 may include one or more components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls the whole operation of the device 1200, such as the operations related to display, phone call, data communication, camera operation and recording operation. The processing component 1202 may include one or more processors 1220 to perform instructions, to complete all or part of blocks of the above method for determining the resource. In addition, the processing component 1202 may include one or more modules for the convenience of interaction between the processing component 1202 and other components. For example, the processing component 1202 may include a multimedia module for the convenience of interaction between the multimedia component 1208 and the processing component 1202.

The memory 1204 is configured to store all types of data to support the operation of the device 1200. Examples of the data include the instructions of any applications or methods operated on the device 1200, contact data, phone book data, messages, pictures, videos, etc. The memory 1204 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1206 may provide power supply for all components of the device 1200. The power supply component 1206 may include power supply management system, one or more power supplies, and other units related to generating, managing and distributing power for the device 1200.

The multimedia component 1208 includes an output interface screen provided between the device 1200 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touch or slide operation. In some embodiments, the multimedia component 1208 includes a front camera and/or a rear camera. When the device 1200 is in an operation mode, such as a shooting mode or a video mode, the front camera or the rear camera may receive external multimedia data Each front camera and rear camera may be a fixed optical lens system or an optical lens system with a focal length and an optical zoom capacity.

The audio component 1210 is configured as an output and/or input signal. For example, the audio component 1210 includes a microphone (MIC). When the device 1200 is in operation mode, such as call mode, record mode, and speech recognition mode, the microphone is configured to receive the external audio signals. The audio signals received may be further stored in the memory 1204 or sent via the communication component 1216. In some embodiments, the audio component 1210 further includes a speaker configured to output an audio signal.

The I/O interface 1212 provides an interface for the processing component 1202 and the peripheral interface module, and the peripheral interface module may be a keyboard, a click wheel, a button, etc. The buttons may include but not limited to a home button, a volume button, a start button and a lock button.

The sensor component 1214 includes one or more sensors, configured to provide various aspects of status assessment for the device 1200. For example, the sensor component 1214 may detect the on/off state of the device 1200 and the relative positioning of the component. For example, the component is a display and a keypad of the device 1200. The sensor component 1214 may further detect the location change of the device 1200 or one component of the device 1200, the presence or absence of contact between the user and the device 1200, the orientation or acceleration/deceleration of the device 1200, and the temperature change of the device 1200. The sensor component 1214 may include a proximity sensor, which is configured to detect the existence of the objects nearby without any physical contact. The sensor component 1214 may further include a light sensor such as CMOS or CCD image sensor, which is configured to use in imaging applications. In some embodiments, the sensor component 1214 may further include an acceleration transducer, a gyroscope sensor, a magnetic sensor, a pressure sensor or a temperature sensor.

The communication component 1216 is configured for the convenience of wire or wireless communication between the device 1200 and other devices. The device 1200 may access wireless networks based on communication standard, such as WiFi, 2G or 3G, 4G NR or their combination. In an example embodiment, the communication component 1216 receives broadcast signals or broadcast-related information from an external broadcast management system via a broadcast channel. In an example embodiment, the communication component 1216 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an embodiment, the device 1200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method for determining the resource.

In an example embodiment, a non-transitory computer readable storage medium is further provided which includes instructions, such as the memory 1204 including instructions. The instructions may be executed by the processor 1220 of the device 1200 to complete the above method for determining the resource. For example, the non-transitory computer readable storage medium may be a ROM, a random access memory (RAM), a CD-ROM, a magnetic tape, a floppy disk, an optical data storage device, etc.

After considering the specification and practicing the disclosure herein, those skilled in the art will easily think of other embodiments of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the embodiments are to be regarded as exemplary only, and the true scope and spirit of the present application are referred to the appended claims. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

It should be noted that relational terms such as first and second are used herein to distinguish one entity or operation from another entity or operation without necessarily requiring or implying any such actual relationship or order between such entities or operations. The terms "comprise", "comprising" or any other variations thereof, are intended to cover a non-exclusive inclusion, such that a process, a method, an article or a device including a series of elements not only includes those elements but also includes other elements not expressly listed, or may further include elements inherent to such process, method, article, or device. In the absence of more constraints, the elements defined by a sentence "comprising one" do not preclude the presence of additional same elements in the process, method, article, or apparatus that includes the elements.

The above are detailed descriptions of embodiments of the present disclosure. Specific examples are applied to elaborate principles and implementations of the present disclosure. The descriptions of the above embodiments are only configured to help understand the method and core concepts of the present disclosure; at the same time, for those skilled in the art, there may be changes in the specific implementation and application scope according to the idea of the present disclosure. In summary, the contents of the summary should not be construed as a limitation of the present disclosure.

What is claimed is:

1. A method for indicating a resource, performed by a base station, the method comprising:
configuring a first Control Resource Set Zero (CORESET #0) on a first time-frequency resource, and configuring a second CORESET #0 on a second time-frequency resource, in response to allowing a first terminal supporting a bandwidth greater than or equal to a preset bandwidth to access and allowing a second terminal supporting a bandwidth less than the preset bandwidth to access;
broadcasting a first index, to indicate the first time-frequency resource to the first terminal and to indicate the second time-frequency resource to the second terminal;
configuring the first CORESET #0 on the first time-frequency resource, in response to allowing the first terminal supporting the bandwidth greater than or equal to the preset bandwidth to access and not allowing the second terminal supporting the bandwidth less than the preset bandwidth to access; and
broadcasting a second index, to indicate the first time-frequency resource to the first terminal.

2. The method of claim 1, further comprising:
allowing the first terminal supporting the bandwidth greater than or equal to the preset bandwidth to access and allowing the second terminal supporting the bandwidth less than the preset bandwidth to access, or allowing the first terminal supporting the bandwidth greater than or equal to the preset bandwidth to access and not allowing the second terminal supporting the bandwidth less than the preset bandwidth to access, based on a received setting command.

3. An electronic device, comprising:
a processor; and
a memory configured to store instructions executable by the processor;
wherein the processor is configured to perform the method of claim 1.

4. A non-transitory computer readable storage medium having stored therein a computer program that, when executed by a processor, causes the processor to perform the method of claim 1.

5. A method for determining a resource, performed by a terminal, the method comprising:
receiving a Master Information Block (MIB) broadcasted by a base station, and determining a frequency domain resource index based on the MIB;
determining first frequency domain resource information associated with the frequency domain resource index based on a first correlation relationship and determining a first frequency domain resource of a first Control Resource Set Zero (CORESET #0) based on the first frequency domain resource information, in response to a bandwidth supported by the terminal being less than a preset bandwidth, wherein a bandwidth corresponding to the first frequency domain resource information is less than the preset bandwidth; and
determining second frequency domain resource information associated with the frequency domain resource index based on a second correlation relationship and determining a second frequency domain resource of a second CORESET #0 based on the second frequency domain resource information, in response to the bandwidth supported by the terminal being greater than or equal to the preset bandwidth, wherein a bandwidth corresponding to the second frequency domain resource information is less than, or equal to, or greater than the preset bandwidth;
wherein the MIB comprises a first index indicating a first time-frequency resource to a first terminal supporting a bandwidth greater than or equal to the preset bandwidth and to indicate a second time-frequency resource to a second terminal supporting a bandwidth less than the preset bandwidth in a case that the base station allows the first terminal to access and allows the second terminal to access; and the MIB comprises a second index indicating the first time-frequency resource to the first terminal in a case that the base station allows the first terminal to access and does not allow the second terminal to access.

6. The method of claim 5, wherein target frequency domain information whose bandwidth is less than the preset bandwidth in the second frequency domain resource information is the same as first target information associated with a target index corresponding to the target frequency domain information in the first frequency domain resource information.

7. The method of claim 5, wherein at least one of the first correlation relationship or the second correlation relationship is a table.

8. The method of claim 5, further comprising at least one of:
storing the first correlation relationship in advance in response to the bandwidth supported by the terminal being less than the preset bandwidth, or
storing the second correlation relationship in advance in response to the bandwidth supported by the terminal being greater than or equal to the preset bandwidth.

9. The method of claim 5, further comprising:
determining a time domain resource index based on the MIB;
determining first time domain resource information associated with the time domain resource index based on a third correlation relationship and determining a first time domain resource of the first CORESET #0 based on the first time domain resource information, in response to the bandwidth supported by the terminal being less than the preset bandwidth; and
determining second time domain resource information associated with the time domain resource index based on a fourth correlation relationship and determining a second time domain resource of the second CORESET #0 based on the second time domain resource information, in response to the bandwidth supported by the terminal being greater than the preset bandwidth.

10. The method of claim 9, wherein at least one of the third correlation relationship or the fourth correlation relationship is a table.

11. The method of claim 9, further comprising: storing at least one of the third correlation relationship or the fourth correlation relationship in advance.

12. A non-transitory computer readable storage medium having stored therein a computer program that, when executed by a processor, causes the processor to perform the method of claim 5.

13. A terminal, comprising:
a processor; and
a memory configured to store instructions executable by the processor;

wherein the processor is configured to:
receive a Master Information Block (MIB) broadcasted by a base station, and determine a frequency domain resource index based on the MIB;
determine first frequency domain resource information associated with the frequency domain resource index based on a first correlation relationship and determine a first frequency domain resource of a first Control Resource Set Zero (CORESET #0) based on the first frequency domain resource information, in response to a bandwidth supported by the terminal being less than a preset bandwidth, wherein a bandwidth corresponding to the first frequency domain resource information is less than the preset bandwidth; and
determine second frequency domain resource information associated with the frequency domain resource index based on a second correlation relationship and determine a second frequency domain resource of a second CORESET #0 based on the second frequency domain resource information, in response to the bandwidth supported by the terminal being greater than or equal to the preset bandwidth, wherein a bandwidth corresponding to the second frequency domain resource information is less than, or equal to, or greater than the preset bandwidth;
wherein the MIB comprises a first index indicating a first time-frequency resource to a first terminal supporting a bandwidth greater than or equal to the preset bandwidth and to indicate a second time-frequency resource to a second terminal supporting a bandwidth less than the preset bandwidth in a case that the base station allows the first terminal to access and allows the second terminal to access; and the MIB comprises a second index indicating the first time-frequency resource to the first terminal in a case that the base station allows the first terminal to access and does not allow the second terminal to access.

14. The terminal of claim 13, wherein target frequency domain information whose bandwidth is less than the preset bandwidth in the second frequency domain resource information is the same as first target information associated with a target index corresponding to the target frequency domain information in the first frequency domain resource information.

15. The terminal of claim 13, wherein at least one of the first correlation relationship or the second correlation relationship is a table.

16. The terminal of claim 13, wherein the processor is further configured to perform at least one of:
storing the first correlation relationship in advance in response to the bandwidth supported by the terminal being less than the preset bandwidth, or
storing the second correlation relationship in advance in response to the bandwidth supported by the terminal being greater than or equal to the preset bandwidth.

17. The terminal of claim 13, wherein the processor is further configured to:
determine a time domain resource index based on the MIB;
determine first time domain resource information associated with the time domain resource index based on a third correlation relationship and determine a first time domain resource of the first CORESET #0 based on the first time domain resource information, in response to the bandwidth supported by the terminal being less than the preset bandwidth; and
determine second time domain resource information associated with the time domain resource index based on a fourth correlation relationship and determine a second time domain resource of the second CORESET #0 based on the second time domain resource information, in response to the bandwidth supported by the terminal being greater than the preset bandwidth.

18. The terminal of claim 17, wherein at least one of the third correlation relationship or the fourth correlation relationship is a table.

19. The terminal of claim 17, wherein the processor is further configured to: store at least one of the third correlation relationship or the fourth correlation relationship in advance.

* * * * *